US008479986B2

(12) United States Patent
Chen et al.

(10) Patent No.: US 8,479,986 B2
(45) Date of Patent: Jul. 9, 2013

(54) RFID-BASED BOOK RETURN APPARATUS

(75) Inventors: Horng-Ji Chen, Hsinchu (TW); Yu-Chyang Cheng, Taipei (TW); Chia-Lin Kuo, Hsinchu (TW)

(73) Assignee: ClarIDy Solutions, Inc., Hsinchu (TW)

( * ) Notice: Subject to any disclaimer, the term of this patent is extended or adjusted under 35 U.S.C. 154(b) by 98 days.

(21) Appl. No.: 13/218,178

(22) Filed: Aug. 25, 2011

(65) Prior Publication Data

US 2013/0015240 A1 Jan. 17, 2013

(30) Foreign Application Priority Data

Jul. 14, 2011 (TW) ............................. 100124946 A

(51) Int. Cl.
*G06K 5/00* (2006.01)

(52) U.S. Cl.
USPC ........... 235/380; 235/381; 235/385; 235/432; 705/28; 700/218

(58) Field of Classification Search
USPC .................. 235/380, 385, 381, 432; 700/218, 700/232; 705/717, 7, 28, 14.58, 17, 44, 39; 348/157
See application file for complete search history.

(56) References Cited

U.S. PATENT DOCUMENTS

| | | | | |
|---|---|---|---|---|
| 5,210,603 | A * | 5/1993 | Sabin | 348/157 |
| 2001/0020198 | A1 * | 9/2001 | Wilson | 700/232 |
| 2008/0255901 | A1 * | 10/2008 | Carroll et al. | 705/7 |
| 2010/0325001 | A1 * | 12/2010 | Barber et al. | 705/17 |
| 2011/0093339 | A1 * | 4/2011 | Morton | 705/14.58 |
| 2011/0270439 | A1 * | 11/2011 | Cabrero Gomez et al. | 700/218 |
| 2012/0066097 | A1 * | 3/2012 | Amos | 705/28 |
| 2012/0324278 | A1 * | 12/2012 | Dent | 714/14 |

FOREIGN PATENT DOCUMENTS

TW M328623 U 3/2008

* cited by examiner

*Primary Examiner* — Thien M Le
*Assistant Examiner* — Sonji Johnson
(74) *Attorney, Agent, or Firm* — Rabin & Berdo, P.C.

(57) ABSTRACT

An RFID-based book return apparatus has dual touch screen and operation interface that conforms to a standard for barrier-free design. It has the following features: automatically detecting RFID tags attached on the identification cards of borrowers and attached to books to be returned, and enabling a panel covering a book-return gate to open; adopting a high-density optical sensor array to prevent the borrower's hand from being clamped accidentally by the cover panel of the book-return gate; enabling an access panel of the book return apparatus to open/close automatically according to the RFID tag detection book return apparatus, facilitating the maintenance and repair of the book return apparatus; preventing any components, papers and books in the book return apparatus from wet damage due to rainfall or moisture by installing a waterproof device on the RFID-based book return apparatus.

25 Claims, 6 Drawing Sheets

RFID-BASED BOOK RETURN APPARATUS

FIELD OF THE INVENTION

The present invention relates to an RFID-based book return apparatus, being substantially an automatic book-return apparatus with dual touch screen and operation interface that is conforming to a standard for barrier-free design, and is featured by the following characteristics: automatically detecting RFID tags that are attached on books to be returned and also attached on the identification cards of borrowers, and consequently enabling a panel covering a book-return gate to open so as to proceed an automatic book return operation; adopting a high-density optical sensor array to be used for preventing the borrower's hand from being clamped accidentally by the cover panel of the book-return gate; enabling an access panel of the RFID-based book return apparatus to open/close automatically according to the RFID tag detection of the RFID-based book return apparatus, and thereby, facilitating the maintenance and repair of the RFID-based book return apparatus including the performing of a procedure for loading papers into a printer configured in the RFID-based book return apparatus.

BACKGROUND OF THE INVENTION

Radio-frequency identification (RFID) is a technology that uses communication via radio waves to exchange data between a reader and an electronic tag attached to an object, for the purpose of identification and tracking. Generally, an radio-frequency identification system involves RFID readers, RFID tags, and an application system. It is noted that the RFID system can be designed to operate using RFID tags of different radio frequencies under different regulations, including low-frequency (LF) RFID tags at 134 KHz typically, high-frequency (HF) RFID tags at 13.56 MHz, ultra-high-frequency (UHF) RFID tags at 860~960 MHz, and microwave RFID tags at 2.4 GHz, and so on. The passive RFID tags have no power source internally and require an external electromagnetic field, that is mostly emitted from RFID readers, to power and activate an internal analog circuit embedded in the passive RFID tags for the chip operations. Generally, such RFID tag can be embedded with memories for data storage, and the memories can be read-only memories (ROM), write-once-read-many (WORM) memories or electrically erasable programmable read-only memories (EEPROM). Operationally, a passive RFID tag is activated by electromagnetic field emitted from a near-by RFID reader, while enabling the RFID reader to access the memories embedded inside the RFID tag, i.e. to read or write data into the memories of the RFID tag.

There are already many studies relating to the developing of automatic book-return system. One of which is a barcode based library automation system disclosed in TW Pat. No. M328623, which primarily comprises: a programmable controller, to be used as the core of the library automation system; a ramp, made of a transparent material and used for guiding a return book to flow down toward a storage box; a barcode scanner, disposed directly under the ramp. However, the aforesaid system is disadvantageous in that: if a book while sliding down the ramp is not orientated for allowing its barcode surface to face directly downward to the barcode scanner that is arranged under the ramp, the book will not be identified and registered as the barcode scanner will not be able to read the barcode of the book; and also there may be scratches formed on the transparent ramp after being used for a period of time, and that will lower the recognition rate and accuracy of the barcode scanner.

In addition, most automatic book return systems that are available today are generally being established specifically for serving adults, and thus their operational interfaces are arranged at a height that is only friendly for adults, but not for children and disabled persons, especially for those wheelchair users.

One major purpose for a library to establish an automatic book return system is to provide its users an easy way to return books without having to enter the library, and thereby, the automatic book return system generally has at least one book-return gate and print-out gate that are opened toward the outside of the library. Although those book-return gate and print-out gate are usually covered by cover panels, they are still not waterproof, and wet damages to the components, papers and books in the book return apparatus due to rainfall or moisture may not be avoided.

SUMMARY OF THE INVENTION

In view of the disadvantages of prior art, the primary object of the present invention is to provide an RFID-based book return apparatus, being substantially an automatic book-return apparatus with dual touch screen and operation interface that is conforming to a standard for barrier-free design, and is featured by the following characteristics: automatically detecting RFID tags that are attached on books to be returned and also attached on the identification cards of borrowers, and consequently enabling a panel covering a book-return gate to open so as to proceed an automatic book return operation; adopting a high-density optical sensor array to be used for preventing the borrower's hand from being clamped accidentally by the cover panel of the book-return gate; enabling an access panel of the RFID-based book return apparatus to open/close automatically according to the RFID tag detection of the RFID-based book return apparatus, and thereby, facilitating the maintenance and repair of the RFID-based book return apparatus including the performing of a procedure for loading papers into a printer configured in the RFID-based book return apparatus.

To achieve the above object, the present invention provides an RFID-based book return apparatus, comprising:

- a control panel, provided to be embedded into a wall of a building so as to be used by a user for proceeding an automatic book return operation relating to the return of whichever book that is attached with an RFID tag;
- a first touch screen, provided specifically for adults to operate easily and conveniently;
- a second touch screen, provided specifically for children and disabled persons to operate easily and conveniently;
- a controller, mounted on the cover panel at an inner side thereof for controlling the operation of an automatic book return software the related components/devices as well;
- a book-return gate, formed on the control panel while connected to a book transportation channel that is extending in a direction opposite to the control panel and used for transporting books processed in the automatic book return operation;
- an RFID antenna, mounted on the cover panel at the inner side thereof so as to be used for detecting the RFID tag attached on the books while transmitted the corresponding detection signal to an RFID reader;
- a printer, formed with a print-out gate;
- a first sensor, for detecting and determining whether the control panel is approached by a user, and if so, the first sensor is enabled to issue a signal for directing the controller to activate the RFID reader so as to access data registered on the RFID tag of whichever book returned by the user and on the borrower's card of the user; and a second sensor, for detecting and determining whether the book-return gate is cleared.

Preferably, the area on the control panel that is provided for the RFID antenna to dispose thereat is made of a non-metallic material.

Preferably, the second sensor is a device selected from the group consisting of: a plurality of optical sensors that are densely arranged, and a safety light grid.

Preferably, there is an electric lock mounted inside the control panel in a manner that the electric lock is locked during power off.

Preferably, the electric lock is a device selected from the group consisting of: a magnetic lock, an anode lock, and a cathode lock.

Preferably, the control panel is manufactured as a one-piece structure or a multi-piece structure.

Preferably, there is further a book collecting cart being arranged at the end of the book transportation channel.

Preferably, the book transportation channel is structured in a manner selected from the group consisting of: a ramp-type rail structure and a conveyor belt structure.

Preferably, the book transportation channel is made of a non-metallic material.

Preferably, the conveyor belt structure is capable of running in forward and reverse directions, and thus is enabled to transport books carried thereon upward and downward as well, and simultaneously, the book transportation channel is designed to have its transportation speed to be controlled effectively and conveniently for enhancing the readability of the RFID tags that are attached to the books being transported thereon; moreover, the conveyor belt structure is enabled to perform a book rejection operation upon a book whose RFID tag is not registered correctly.

Preferably, the conveyor belt structure is composed of: an assembly of rollers, motors and belts, configured for allowing the rollers to be driven to rotate by the motors through the connection of the belts; at least one side panel; at least one sensor, each being mounted on the at least one side panel for detecting whether there is any book that is being transported on the conveyor belt structure, and if so, it is enabled to issue a signal for activating the RFID reader to access data registered on the RFID tag of the book through the RFID antenna.

Preferably, each roller is being configured a spring element for enabling the conveyor belt structure to have sufficient tension and thus enhancing the transportation performance of the conveyor belt structure and also its durability as well.

Preferably, the RFID tag is substantially an ultra-high frequency (UHF) RFID tag.

Preferably, there is further a camcorder being mounted on the control panel at the inner side thereof.

Preferably, there is further a speaker phone being mounted on the control panel at the inner side thereof.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
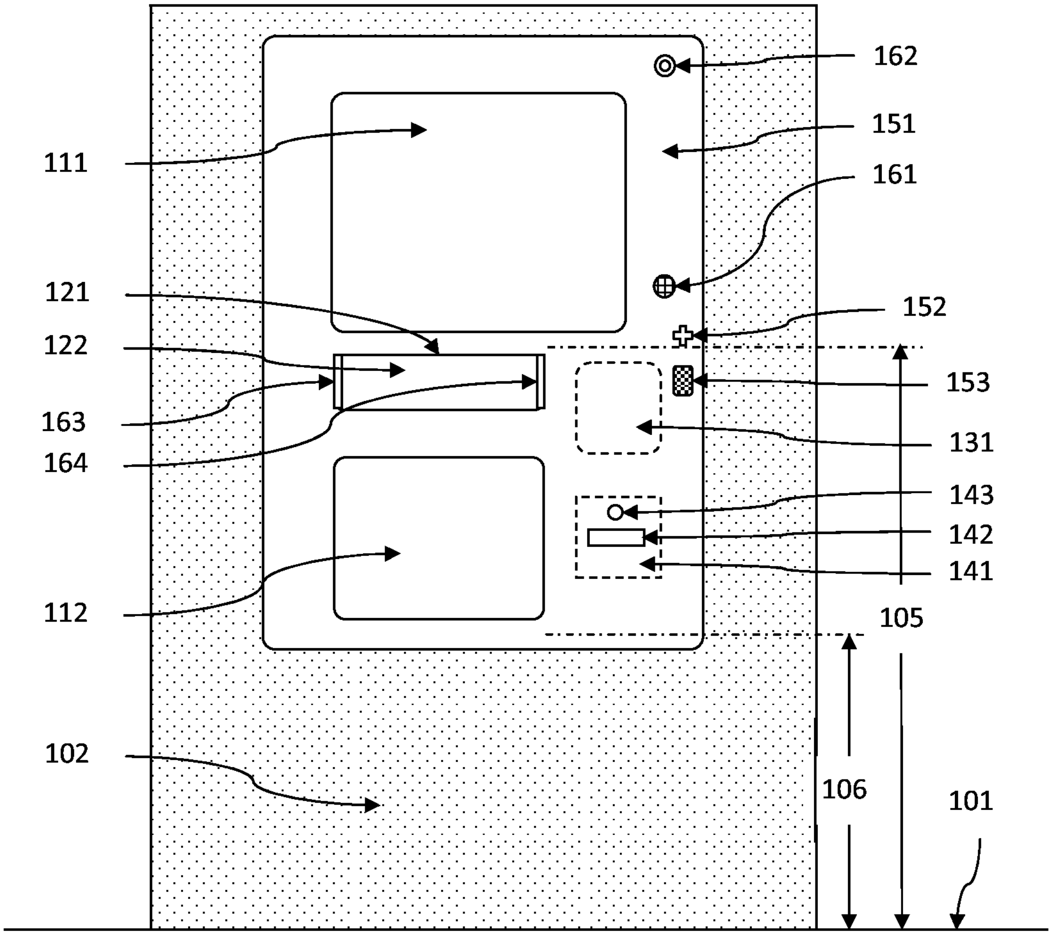
FIG. 1 is a schematic diagram showing a control panel used in an RFID-based book return apparatus of the present invention.
Figure 2:
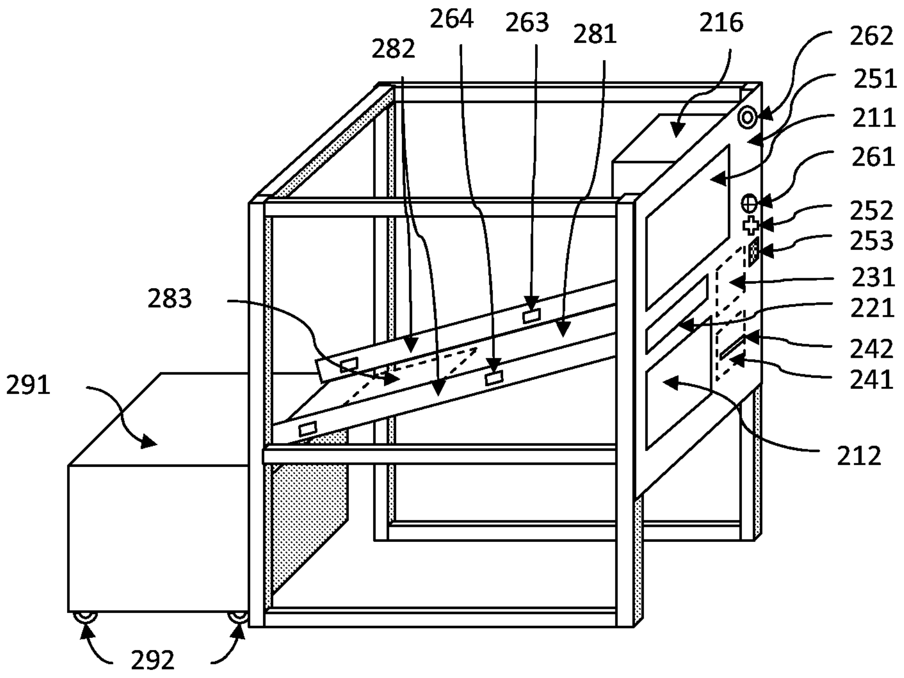
FIG. 2 is a schematic diagram showing an RFID-based book return apparatus according to an embodiment of the present invention.

Please refer to FIG. 1 and FIG. 2, which are schematic diagrams showing a control panel and an RFID-based book return apparatus of the present invention. As shown in FIG. 1 and FIG. 2, the RFID-based book return apparatus has a control panel 151 that is designed to be embedded in a wall 102 of a building so as to be used by a user for proceeding an automatic book return operation relating to the return of whichever book that is attached with an RFID tag without having to enter the building. In this embodiment, the user can perform the automatic book return operation using touch screens, and there are two touch screens provided in the RFID-based book return apparatus, in which the first touch screen, as the first touch screens 111 and 211 shown respectively in FIG. 1 and FIG. 2, is provided specifically for adults to operate easily and conveniently, while the second touch screen, as the second touch screens 112 and 212 shown respectively in FIG. 1 and FIG. 2, is provided specifically for children and disabled persons to operate easily and conveniently. In addition, as shown respectively in FIG. 1 and FIG. 2, the RFID-based book return apparatus is further configured with an operation interface including: a book return gate 121, 221, an RFID antenna 131, 231, a print-out gate 142, 242. It is noted that both the second touch screen and the operation interface should be arranged respectively at a height that conforms to a standard for barrier-free design, that is, it is restricted to be arranged no higher than a maximum height 105 and no lower than a minimum height 106, as defined in related regulations, such as A102.3.1 is issued by the Internal Affair Ministry of Taiwan government where the maximum height is defined to be 120 cm and the minimum height is defined to be 40 cm.

Figure 4:
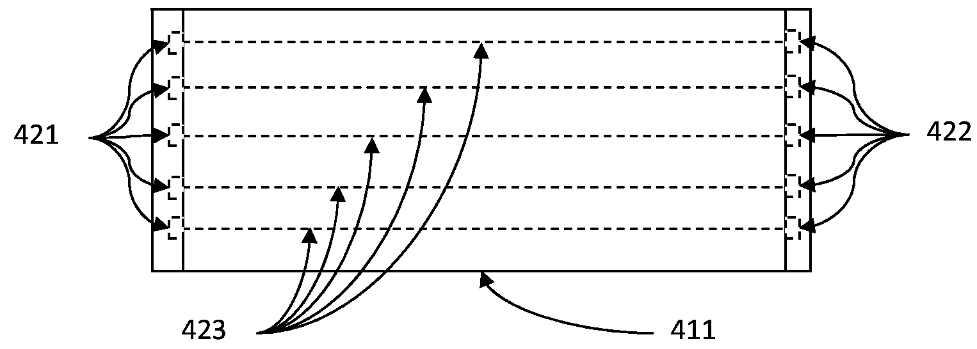
FIG. 4 is a schematic diagram showing a book return gate of the present invention that is configured with a safety light grid.

The RFID-based book return apparatus further comprises a controller 216 that is mounted on the control panel 151 at the inner side thereof for controlling the operation of an automatic book return software the related components/devices as well. In this embodiment, the controller 216 can be a personal computer, a industrial computer, a notebook computer, a tablet computer, an embedded control card, a micro processor control card, a programmable logic controller (PLC), and so on. As shown in FIG. 1 and FIG. 2, the RFID-based book return apparatus further comprises: at least one RFID antenna 131, 231. It is noted that each of the RFID antenna 131, 231 can either be integrated with an RFID reader, or can be electrically connected to the RFID reader by coaxial cable. It is noted that each RFID reader is not restricted to be connected to only one RFID antenna. In a condition when the RFID antenna 131, 231 is electrically connected to an RFID reader by a coaxial cable, the RFID reader can be disposed at any position of in the RFID-based book return apparatus at will as required, whichever is capable of functioning normally for accessing data registered on the RFID tags of books returned by the user and on the borrower's card of the user. Especially, the area on the RFID-based book return apparatus that is provided for the RFID antenna 131, 231 to be disposed thereat should be made of a non-metallic material, by that the electromagnetic wave transmission enabled by the RFID antenna 131, 231 will not be blocked and thus can be used in the automatic book return operation and the accessing to the RFID tag attached on borrower's card. In addition, there can be sensors 161 disposed in the RFID-based book return apparatus. If the sensors are substantially infrared sensors, they can be used for detecting and determining whether the control panel is approached by a user; and if so, the infrared sensor will be enabled to issue a signal for activating the RFID reader to access data registered on the RFID tag of whichever book returned by the user and on the borrower's card of the user. Thereafter, when the data accessed from the RFID tag is determined to be correct, that is, the data is compatible to whichever is required for allowing the proceeding of the automatic book return operation, for example, the borrower's card is legitimate and up-to-date, or the book is belonged to the library where the RFID-based book return apparatus is arranged, and so forth, the cover panel 122 covering the book return gate 121, 221 will be opened. In addition to the foregoing way for enabling the cover panel 122 to open, under actual requirement form library management, the cover panel 122 can be controlled to open through software control by the use of the first touch screen 111, 211 or the second touch screen 112, 212. After the cover panel 122 is opened, the user is able to insert whichever books he/she wants to return to the library into the book return gate 121, 221, and thus performs the automatic book return operation through the use of either the first touch screen 111, 211 or the second touch screen 112, 212. Then, as soon as the automatic book return operation is complete, the printer 141, 241 of the RFID-based book return apparatus will be enabled to print out a receipt that is to be outputted from its print-out gate 142, 242. In addition to that, the RFID-based book return apparatus can be equipped with an indication device 143 so as to issue an indication signal to the user for reminding the same to retrieve the receipt. Operationally, the indication device 143 can substantially be an array of light sources that each light source can be a light emitting diode, a flash light, a fluorescent light, or a light bulb, whichever is capable of emitting light in either a continuous manner or in an intermittent manner. In another embodiment of the invention, the indication device 143 can be a device selected from the group consisting of: an audio device, a horn and a buzzer, and is capable of performing one operation selected from the group consisting of: broadcasting a prerecorded speech, playing a specific music, being activated for emitting a sound in a continuous manner or in an intermittent manner through a horn or a buzzer. After the automatic book return operation is completed, the RFID-based book return apparatus will enabled sensors 163, 164 that are disposed surrounding the book return gate 121, 221 for detecting and determining whether the book return gate 121, 221 is cleared; and if so, the cover panel 122 is activated for closing the book return gate 121, 221. However, if the sensors 163, 164 detects that there is a foreign object blocking the book return gate 121, 221 during the closing of the cover panel 122, the closing of the cover panel 122 will be terminated while enabling the cover panel 122 to open again so as to prevent certain accidents, like the borrower's hand being clamped by the cover panel 122, from happening. After a period of time had passed after the termination of the closing of the cover panel 122, and during which there is no foreign object being detected by the sensors 163, 134 existed in the book return gate 121, 221, the closing of the cover panel 122 will be resumed. In this embodiment, the sensor 163, 164 that is used for determining whether the book return gate 121, 221 is cleared can be a device selected from the group consisting of: a plurality of optical sensors that are densely arranged, and a safety light grid. Please refer to FIG. 4, which is a schematic diagram showing a book return gate of the present invention that is configured with a safety light grid. As shown in FIG. 4, the safety light grid 421, 422 that is arranged at the book return gate 411 is enabled to emit a plurality of beams that are projecting parallel to one another while enabling any two neighboring beams to be spaced from each other by a beam gap no larger than the average thickness of a human finger, and thereby, the accident of a human hand being clamping by the cover panel can be prevented effectively.

For facilitating the maintenance and repair of the RFID-based book return apparatus including the performing of a procedure for loading papers into the printer configured in the RFID-based book return apparatus, the RFID-based book return apparatus is configured with an electric lock 152 at the inner side of its control panel 151 while enabling the same to be unlocked or locked according to the detection of an authorizing RFID tag. That is, by the detection of the RFID reader through the RFID antenna 131, 231, any RFID tag that has an authorization code registered therein can be used as the key for locking or unlocking the electric lock 152 according to the control of the control software programmed in the RFID-based book return apparatus. It is noted that the authorizing RFID tag can be attached to a library employee ID card, a maintenance technician ID card, or borrower's card whichever is authorized by the library management system. Moreover, the electric lock is a device selected from the group consisting of: a magnetic lock, an anode lock, and a cathode lock; and in this embodiment, the electric lock 152 is configured to operate in a manner that the electric lock 152 is locked during power off, by that the control panel will not be operable during power outage and thus any unlawful acts such as stealing and vandalism can be prevented. Moreover, the control panel 151 can be manufactured as a one-piece structure, or as a multi-piece structure that has some pieces to be fixed while allowing others to be movable so as to form openings to be used in maintenance or loading papers.

Figure 3A:
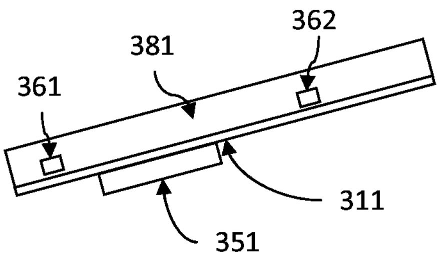
FIG. 3A, FIG. 3B and FIG. 3C are schematic diagrams showing different book transportation channels that are adapted for the RFID-based book return apparatus of the present invention.
Figure 3B:
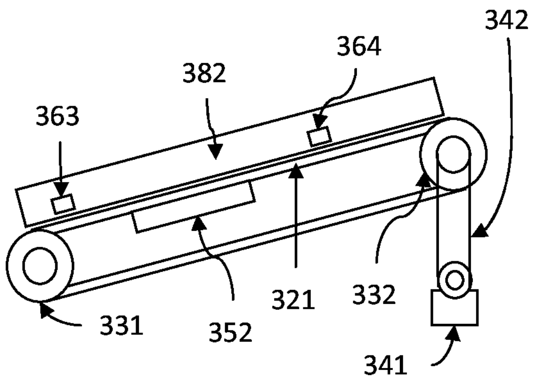
Figure 3C:
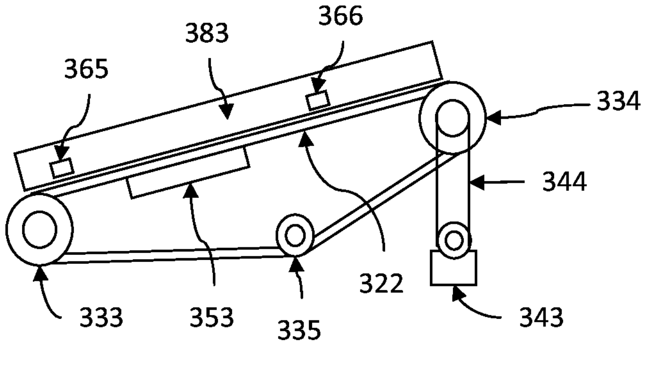

After being inserted into the book return gate 121, 221, the book will be transported by a book transportation channel 281 and travel passing a sensor 263, and thereby, the sensor will activate an RFID reader to access data that is registered in the memory embedded inside the RFID tag 521, 522 attached on the book through the RFID antenna 283 while updating the status of the book that is stored inside the RFID tag 521, 522 form a "borrowed" status into a "returned" status. After updating the status of the RFID tag 521, 522 into "returned", the book will slide into a book collecting cart 291 located at the end of the book transportation channel 281. As shown in FIG. 2, the book collecting cart 291 has wheels 292 installed thereon so that it can be moved easily to any location in the library for returning the returned books to their specific locations. Moreover, the book transportation channel 281 can be formed as a ramp-type rail structure, in which the inclination angle and the length of its substrate 311 are determined according to the moving speed of a book that is sliding down on the substrate and the speed limit within which the RFID reader is able to access the RFID tag attached on the book, as shown in FIG. 3A. In addition to the substrate 311, the book transportation channel 281 further comprises: at least one side panel 381; at least one sensor 361, 362, each being mounted on the at least one side panel 381 for detecting whether there is any book that is being transported on the book transportation channel 281, and if so, it is enabled to issue a signal for activating the RFID reader to access data registered on the RFID tag of the book through the RFID antenna 351 that is disposed under the substrate 311 of the book transportation channel 281. It is noted that the sensing area on the substrate that is arranged corresponding to the RFID antenna 351 should be made of a non-metallic material for allowing the transceiving of electromagnetic waves. In addition, the substrate 311 can further be installed with a plurality of rollers so as to enhancing the transportation smoothness of book while sliding on the substrate 311. As shown in FIG. 3B, the book transportation channel can be formed as a conveyor belt structure, which is further composed of: an assembly of a conveyor belt 321, rollers 331, 332, motors 341 and belts 342, configured for allowing the rollers to be driven to rotate by the motors through the connection of the belts 342; and at least one side panel 382; and at least one sensor 363, 364, each being mounted on the at least one side panel 382 for detecting whether there is any book that is being transported on the conveyor belt structure, and if so, it is enabled to issue a signal for activating the RFID reader to access data registered on the RFID tag of the book through the RFID antenna 352 that is disposed under the substrate 311 of the book transportation channel 281. It is noted that the conveyor belt 321 should be made of a non-metallic material for allowing the RFID antenna 352 to transmit/receive electromagnetic waves therethrough. Moreover, as the conveyor belt structure is capable of running in forward and reverse directions, books carried thereon can be transported upward and downward as required at will, and simultaneously, the book transportation channel can have its transportation speed to be controlled effectively and conveniently for enhancing the readability of the RFID tags that are attached to the books being transported thereon. Not to mention that the conveyor belt structure is suitable for performing a book rejection operation upon a book whose RFID tag is not registered correctly. The conveyor belt 321 of the convey belt structure can be designed to move an object forwardly or reversely in a transportation path that is inclined by an angle as required, and such inclination angle is determined according to the design as well as the material of the conveyor belt in view of ensuring the object to be transported smoothly on the conveyor belt while minimizing the wear and tear to the book caused by the transportation. However, it is more than common that the conveyor belt is relaxed and is no longer tense enough for transporting objects effectively after being used for a period of time. Thus, the present invention provides another conveyor belt structure for overcoming the aforesaid shortcoming. As shown in FIG. 3C, similarly the book transportation channel 281, being formed as a conveyor belt structure, is composed of: an assembly of a conveyor belt 322, rollers 333, 334, 335, motors 344 and belts 343, configured for allowing the rollers to be driven to rotate by the motors through the connection of the belts 343; and at least one side panel 383; and at least one sensor 365, 366, each being mounted on the at least one side panel 383 for detecting whether there is any book that is being transported on the conveyor belt structure, and if so, it is enabled to issue a signal for activating the RFID reader to access data registered on the RFID tag of the book through the RFID antenna 353 that is disposed under the substrate 322 of the book transportation channel 281. It is noted that the conveyor belt 322 should be made of a non-metallic material for allowing the RFID antenna 353 to transmit/receive electromagnetic waves therethrough. The difference between the embodiments shown in FIG. 3B and FIG. 3C is that: each roller 335 in FIG. 3C is configured with a spring element for enabling the conveyor belt structure to have sufficient tension and thus enhancing the transportation performance of the conveyor belt structure and also its durability as well.

Figure 5A:
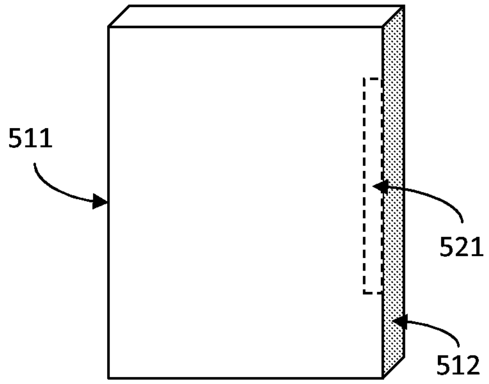
FIG. 5A and FIG. 5B are schematic diagrams showing RFID tags of different shape that are designed to be attached to different positions of a book according to the present invention.
Figure 5B:
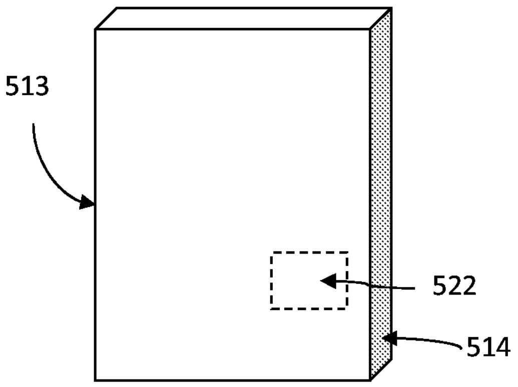

Please refer to FIG. 5A and FIG. 5B, which are schematic diagrams showing RFID tags of different shape that are designed to be attached to different positions of a book according to the present invention. As shown in FIG. 5A, the RFID tag 521, being an ultra-high frequency (UHF) RFID tag that is formed like a slim bar, is small in area and light in weight and thus can be attached to any page of a book at a position proximate to the back 512 of the book, by that not only its invisibility is greatly enhanced, but also the probability of being torn apart is also greatly reduced. On the other hand, if the RFID tag is formed like a large-area rectangle, it is not suitable to be attached to the book pages, but instead is suitable to be attached to the cover of a book 512 or the inner side of the cover at any position that is not near to the back 522 of the book 512. Consequently, the RFID tag is easily visible and exposed that it should be sealed for preventing the same from being torn apart accidently.

For providing inquiry service to users and also facilitating the maintenance of the RFID-based book return apparatus, the control panel 151 is further being configured with a camcorder 161, 262 and a speakerphone 153, 253, by that the management staff can monitor the proceeding of any book return operation that is performed on the RFID-based book return apparatus, and also is able to provide an instant inquiry service or/and failure recovery service to any user that is in trouble, and consequently, improves the effective usage rate of the RFID-based book return apparatus.

Figure 6A:
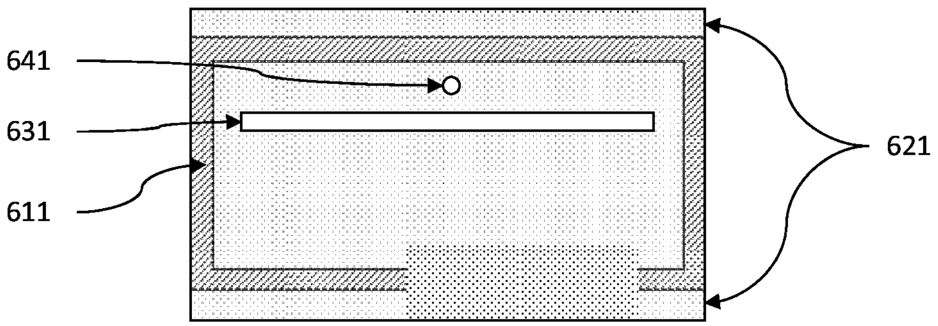
FIG. 6A to FIG. 6E are schematic diagrams showing a variety of waterproof devices being adapted for the present invention.
Figure 6B:
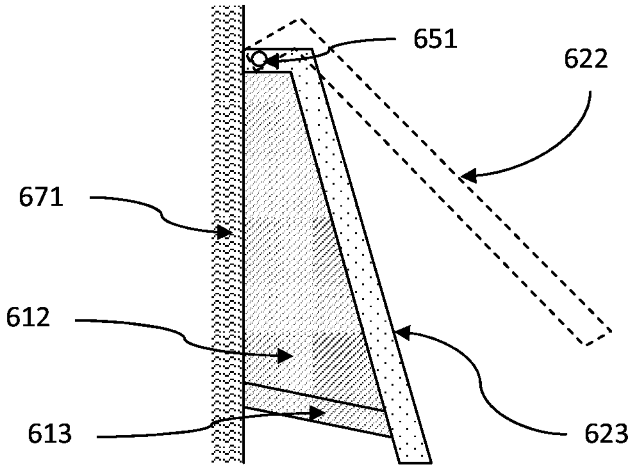
Figure 6C:
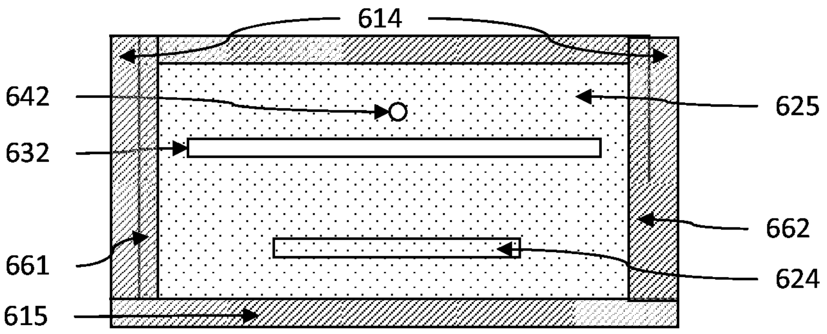
Figure 6D:
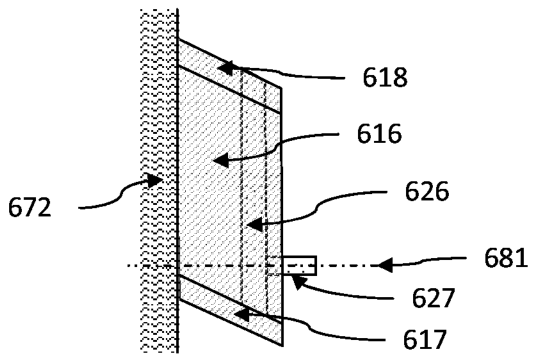
Figure 6E:
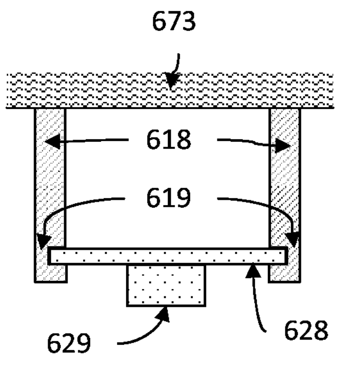

As shown in FIG. 1, the control panel 151 is formed with a plurality of openings, and some of which are provided for the first touch screen 111, the second touch screen 112, the sensor 161, and the camcorder 162 to inset therein, while some others should be maintained opened all the time, such as the print-out gate 142, and some should be opened and closed in an alternating manner, such as the book return gate 121. Therefore, the RFID-base book return apparatus should be configured with a kind of waterproof device so as to prevent any components, papers and books in the RFID-based book return apparatus from wet damage due to rainfall or moisture. Please refer to FIG. 6A and FIG. 6B, which are a front view and a side view of a waterproof device that is adapted for the present invention. As shown in FIG. 6A and FIG. 6B, there is a waterproof frame 611 adapted to be disposed surrounding an opening 631 formed on the control panel, and the waterproof frame 611 can be made of acrylic, plastic, metal, carbon fiber, wood, ceramic, or glass, and in a shape selected from the group consisting of: a rectangle shape, an oval shape, a circular shape and other basic geometric shapes, whichever is capable of effectively enclosing the opening therein. In addition, each of the waterproof frame 611, 612 and the waterproof substrate 613 is an integrally formed one-piece component or a multi-piece assembly; and for enhancing the waterproof capability of the control panel 671, the control panel 671 is further being attached with waterproof elements including waterproof washers, waterproof silicon, and waterproof adhesive; and in a condition when the control panel 671 is made of a metal, the waterproof frame can be attached to the control panel 671 by welding for enhancing the airtightness and waterproof capabilities of the same. In addition, the waterproof frame 611, 612 is covered by a waterproof cover 621, 623 that is pivotally coupled to a waterproof shaft 651 in a manner that it can cover naturally on the waterproof frame 611, 612 by gravity. It is noted that the opening angle of the waterproof cover 622 can be determined according to actual requirement; and the bottom board 613 of the waterproof frame 611, 612 is designed to have a cross section that is shaped like a trapezoid, by that water that leaks into the waterproof frame when the waterproof cover 621 is opened can fall on the inclined surface of the bottom board 613 so as to flow naturally down and out of the waterproof frame by gravity. In another embodiment shown in FIG. 6C and FIG. 6D, similarly, there is a waterproof frame 611 adapted to be disposed surrounding an opening 631 formed on the control panel, and the waterproof frame 611 can be made of acrylic, plastic, metal, carbon fiber, wood, ceramic, or glass, and in a shape selected from the group consisting of: a rectangle shape, an oval shape, a circular shape and other basic geometric shapes, whichever is capable of effectively enclosing the opening therein. In addition, each of the waterproof frame 611, 612 and the waterproof substrate 613 is an integrally formed one-piece component or a multi-piece assembly; and for enhancing the waterproof capability of the control panel 671, the control panel 671 is further being attached with waterproof elements including waterproof washers, waterproof silicon, and waterproof adhesive; and in a condition when the control panel 671 is made of a metal, the waterproof frame can be attached to the control panel 671 by welding for enhancing the airtightness and waterproof capabilities of the same. However, the embodiment shown in FIG. 6C and FIG. 6D is different from the one shown in FIG. 6A and FIG. 6B in that: not only there is a waterproof chute 661, 662 formed on the waterproof frame, but also there is handle 624 formed on the waterproof cover 625, by that the waterproof cover 625 can be moved easily in the ranged defined by the waterproof chute 661, 662. Similarly, the bottom board 617 of the waterproof frame is designed to have a cross section that is shaped like a trapezoid, by that water that leaks into the waterproof frame when the waterproof cover 626 is opened can fall on the inclined surface of the bottom board 617 so as to flow naturally down and out of the waterproof frame by gravity. As shown in FIG. 6E, the waterproof frame 618 is mounted fixedly on the control panel 673 while allowing the waterproof cover to be slide easily and smoothly following the guidance of the waterproof chute 619 formed on the waterproof frame 618 by the use of the handle 629, and thereby, enabling the waterproof cover to open or close accordingly. In addition to that, the RFID-based book return apparatus can be equipped with an indication device 641, 642 so as to issue an indication signal to the user for reminding the same to retrieve the receipt, whereas the indication device 641, 642 can be an array of light sources or an audio device whichever is capable of achieving the aforesaid purpose. In another embodiment of the invention, there can be a waterproof gate to be installed in front of the RFID-based book return apparatus, and the waterproof gate can be a roller shutter door, an overhead door, and so on, whichever is equipped with waterproof ability and also is configured with certain sensors, such as pressure sensors, optical sensors and bio sensors, so as to be used for detecting the approaching of any foreign object and thus preventing any clamping accident from happening. Although such waterproof gate is generally being designed to open and close automatically, it is required to have an emergency manual override for dealing with accidental power outage since it is mostly like to be used during extreme weather conditions.

In addition to books, the automatic return apparatus of the present invention can also be adapted for returning other objects, such as disc, video tape, cassette, memory card, and so on, in which the disc includes compact disk (CD), video compact disk (VCD), digital compact disk (DVD), laser disk (LD), compact disk read only memory (CD-ROM), and the like.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An RFID-based book return apparatus, comprising:

a control panel provided to be embedded into a wall of a building so as to be used by a user for proceeding with an automatic book return operation relating to the return of a book that is attached to a book RFID tag;

a first touch screen provided specifically for adults to operate easily and conveniently;

a second touch screen provided specifically for children and disabled persons to operate easily and conveniently;

a cover panel;

a controller mounted on the cover panel at an inner side thereof for controlling an operation of an automatic book return software and components/devices related to the operation of the automatic book return software as well;

a book transportation channel extending in a direction opposite to the control panel and used for transporting books processed in the automatic book return operation;

a book-return gate formed on the control panel while being connected to the book transportation channel;

an RFID reader;

an RFID antenna mounted on the cover panel at the inner side thereof so as to be used for detecting the book RFID tag while transmitting a corresponding detection signal to the RFID reader;

a printer formed with a print-out gate;

a first sensor for detecting and determining whether the control panel is approached by the user, and if so, the first sensor is enabled to issue a signal for directing the controller to activate the RFID reader so as to access data registered on the book RFID tag and on a borrower card of the user; and a second sensor for detecting and determining whether the book-return gate is cleared, wherein the book transportation channel is a structure selected from the group consisting of a ramp-type rail structure and a conveyor belt structure, wherein the conveyor belt structure runs in forward and reverse directions, and thus is enabled to transport books carried thereon upward and downward, and simultaneously, the book transportation channel is designed to have a transportation speed to be controlled effectively and conveniently for enhancing a readability of RFID tags which are attached to books being transported thereon, further, the conveyor belt structure is enabled to perform a book rejection operation upon a book having an RFID tag that is not registered correctly.

2. The RFID-based book return apparatus of claim 1, wherein an area on the control panel that is provided for the RFID antenna to be disposed thereat is made of a non-metallic material.

3. The RFID-based book return apparatus of claim 1, wherein the second sensor is a device selected from the group consisting of a plurality of optical sensors that are densely arranged, and a safety light grid.

4. The RFID-based book return apparatus of claim 1, further comprising an electric lock mounted the control panel at an inner side thereof, the electric lock being locked during power off.

5. The RFID-based book return apparatus of claim 4, wherein the electric lock is a device selected from the group consisting of a magnetic lock, an anode lock, and a cathode lock.

6. The RFID-based book return apparatus of claim 5, wherein the book transportation channel is made of a non-metallic material.

7. The RFID-based book return apparatus of claim 1, wherein the control panel is manufactured as a one-piece structure or a multi-piece structure.

8. The RFID-based book return apparatus of claim 1, wherein there is a book collecting cart arranged at an end of the book transportation channel.

9. The RFID-based book return apparatus of claim 1, wherein the book transportation channel is made of a non-metallic material.

10. The RFID-based book return apparatus of claim 1, wherein the conveyor belt structure is further composed of:

rollers;

motors;

belts, wherein the rollers are driven to rotate by the motors through a connection of the belts;

at least one side panel; and at least one sensor, each being mounted on the at least one side panel for detecting whether there is any book that is being transported on the conveyor belt structure, and if so, it is enabled to issue a signal for activating the RFID reader to access data registered on an RFID tag of the book, that is transported on the conveyor belt structure, through the RFID antenna.

11. The RFID-based book return apparatus of claim 10, wherein each roller includes a spring element for enabling the conveyor belt structure to have sufficient tension and thus enhancing a transportation performance of the conveyor belt structure and a durability of the conveyor belt structure.

12. The RFID-based book return apparatus of claim 1, wherein the book RFID tag is substantially an ultra-high frequency (UHF) RFID tag.

13. The RFID-based book return apparatus of claim 1, further comprising a camcorder being mounted on the control panel at an inner side thereof.

14. The RFID-based book return apparatus of claim 1, further comprising a speaker phone being mounted on the control panel at an inner side thereof.

15. The RFID-based book return apparatus of claim 1, further comprising an indication device being arranged at a position proximate to the printer, the indication device providing an indication signal of light or sound.

16. The RFID-based book return apparatus of claim 15, wherein the indication device is substantially an array of light sources, each selected from the group consisting of a light emitting diode, a flash light, a fluorescent light, and a light bulb.

17. The RFID-based book return apparatus of claim 15, wherein the indication device is a device selected from the group consisting of an audio device, a horn and a buzzer, and performs one operation selected from the group consisting of broadcasting a pre-recorded speech, playing a specific music, and being activated for emitting a sound in a continuous manner or in an intermittent manner through the horn or the buzzer.

18. The RFID-based book return apparatus of claim 1, further comprising a waterproof device being arranged at the book return gate.

19. The RFID-based book return apparatus of claim 18, wherein the waterproof device is composed of a waterproof frame, a waterproof substrate, a waterproof cover, a waterproof handle and a waterproof chute.

20. The RFID-based book return apparatus of claim 19, wherein the waterproof frame is made of a material selected from the group consisting of acrylic, plastic, metal, carbon fiber, wood, ceramic, and glass.

21. The RFID-based book return apparatus of claim 19, wherein the waterproof frame is formed in a shape selected from the group consisting of a rectangle shape, an oval shape, a circular shape and other basic geometric shapes.

22. The RFID-based book return apparatus of claim 19, wherein one of the waterproof frame and the waterproof substrate is an integrally formed one-piece component or a multi-piece assembly.

23. The RFID-based book return apparatus of claim 1, wherein the book transportation channel is the conveyor belt structure.

24. An RFID-based book return apparatus, comprising:

a control panel provided to be embedded into a wall of a building so as to be used by a user for proceeding with an automatic book return operation relating to the return of a book that is attached to a book RFID tag;

a first touch screen provided specifically for adults to operate easily and conveniently;

a second touch screen provided specifically for children and disabled persons to operate easily and conveniently;

a cover panel;

a controller mounted on the cover panel at an inner side thereof for controlling an operation of an automatic book return software and components/devices related to the operation of the automatic book return software as well;

a book transportation channel extending in a direction opposite to the control panel and used for transporting books processed in the automatic book return operation;

a book-return gate formed on the control panel while being connected to the book transportation channel;

an RFID reader;

an RFID antenna mounted on the cover panel at the inner side thereof so as to be used for detecting the book RFID tag while transmitting a corresponding detection signal to the RFID reader;

a printer formed with a print-out gate;

a first sensor for detecting and determining whether the control panel is approached by the user, and if so, the first sensor is enabled to issue a signal for directing the controller to activate the RFID reader so as to access data registered on the book RFID tag and on a borrower card of the user;

a second sensor for detecting and determining whether the book-return gate is cleared; and waterproof elements including waterproof washers, waterproof silicon, and waterproof adhesive, wherein for enhancing the waterproof capability of the control panel, the control panel is further attached with the waterproof elements including the waterproof washers, the waterproof silicon, and the waterproof adhesive, and in a condition when the control panel is made of a metal, a welding operation is applied on the control panel for enhancing the airtightness and a waterproof capability of the same.

25. An RFID-based book return apparatus, comprising:

a control panel provided to be embedded into a wall of a building so as to be used by a user for proceeding with an automatic book return operation relating to the return of a book that is attached to a book RFID tag;

a first touch screen provided specifically for adults to operate;

a second touch screen provided specifically for children and disabled persons to operate;

a cover panel;

a controller mounted on the cover panel at an inner side thereof for controlling an operation of an automatic book return software and components/devices related to the operation of the automatic book return software;

a book transportation channel extending in a direction away from the control panel and used for transporting books processed in the automatic book return operation;

a book-return gate formed on the control panel while being connected to the book transportation channel;

an RFID reader;

an RFID antenna mounted on the cover panel at the inner side thereof so as to be used for detecting the book RFID tag while transmitting a corresponding detection signal to the RFID reader;

a printer formed with a print-out gate;

a first sensor for detecting and determining whether the control panel is approached by the user, and if so, the first sensor is enabled to issue a signal for directing the controller to activate the RFID reader so as to access data registered on the book RFID tag and on a borrower card of the user; and a second sensor for detecting and determining whether the book-return gate is cleared, wherein the book transportation channel is a structure selected from the group consisting of a ramp-type rail structure and a conveyor belt structure, wherein the conveyor belt structure runs in forward and reverse directions, and thus is enabled to transport books carried thereon upward and downward, and simultaneously, the book transportation channel is designed to have a transportation speed be controlled for enhancing a readability of RFID tags which are attached to books being transported thereon, further, the conveyor belt structure is enabled to perform a book rejection operation upon a book having an RFID tag that is not registered correctly.

* * * * *